(12) United States Patent
Beuchert et al.

(10) Patent No.: US 12,467,754 B2
(45) Date of Patent: Nov. 11, 2025

(54) EVALUATION DEVICE AND METHOD FOR OPERATING A SENSOR SYSTEM EQUIPPED WITH A MAGNETIC SENSOR AND AT LEAST ONE INERTIAL SENSOR

(71) Applicant: Robert Bosch GmbH, Stuttgart (DE)

(72) Inventors: Hanna Beuchert, Reutlingen (DE); Athira Sadanandan, Kozhikode (IN); Rui Zhang, Wannweil (DE)

(73) Assignee: ROBERT BOSCH GMBH, Stuttgart (DE)

( * ) Notice: Subject to any disclaimer, the term of this patent is extended or adjusted under 35 U.S.C. 154(b) by 296 days.

(21) Appl. No.: 18/450,560

(22) Filed: Aug. 16, 2023

(65) Prior Publication Data
US 2024/0068815 A1 Feb. 29, 2024

(30) Foreign Application Priority Data
Aug. 23, 2022 (DE) ................. 10 2022 208 698.8

(51) Int. Cl.
| | | |
|---|---|---|
| G01C 21/16 | (2006.01) | |
| A61B 5/11 | (2006.01) | |
| G01C 17/38 | (2006.01) | |
| G01C 25/00 | (2006.01) | |
| G01R 33/00 | (2006.01) | |
| G01R 33/02 | (2006.01) | |
| G01R 33/025 | (2006.01) | |

(52) U.S. Cl.
CPC ......... *G01C 21/165* (2013.01); *G01C 25/005* (2013.01)

(58) Field of Classification Search
CPC .... G01C 21/165; G01C 25/005; G01C 17/38; G01C 21/16; G01R 33/0005; G01R 33/025; G01R 33/0082; G01R 33/02; A61B 5/1116; A61B 5/1126
See application file for complete search history.

(56) References Cited

U.S. PATENT DOCUMENTS

| | | | |
|---|---|---|---|
| 9,341,683 B2 * | 5/2016 | Friend | G01C 17/38 |
| 9,448,072 B2 * | 9/2016 | Bandyopadhyay | G01C 21/188 |

(Continued)

FOREIGN PATENT DOCUMENTS

| | | |
|---|---|---|
| DE | 102014211283 A1 | 12/2014 |
| DE | 102020208409 A1 | 1/2022 |
| DE | 102021107637 A1 | 9/2022 |

*Primary Examiner* — Laura Martin
*Assistant Examiner* — Anthony W Megna Fuentes
(74) *Attorney, Agent, or Firm* — NORTON ROSE FULBRIGHT US LLP

(57) ABSTRACT

An evaluation device for a sensor system equipped with a magnetic sensor and at least one inertial sensor. The evaluation device includes an electronics device, using which a value of an orientation variable may be determined in view of at least one supplied inertial sensor signal and at least one supplied magnetic sensor signal. Using the electronics device, a comparison value for the at least one orientation variable is determined in view of the inertial sensor signal and in disregard of the magnetic sensor signal. In view of a deviation and/or a correlation coefficient between the value and the comparison value, an information item regarding a reliability of the magnetic sensor signal of the magnetic sensor and/or regarding an occurrence of magnetic and/or electrical interference in a surrounding area of the magnetic sensor, is determined.

13 Claims, 3 Drawing Sheets

(56) References Cited

U.S. PATENT DOCUMENTS

| | | | |
|---|---|---|---|
| 11,579,210 B1* | 2/2023 | Jordan | G01R 33/0082 |
| 2012/0296596 A1* | 11/2012 | Profitt | G06F 3/0346 |
| | | | 702/104 |
| 2014/0297212 A1* | 10/2014 | Anderson | G01C 25/005 |
| | | | 702/90 |

* cited by examiner

EVALUATION DEVICE AND METHOD FOR OPERATING A SENSOR SYSTEM EQUIPPED WITH A MAGNETIC SENSOR AND AT LEAST ONE INERTIAL SENSOR

CROSS REFERENCE

The present application claims the benefit under 35 U.S.C. § 119 of German Patent Application No. DE 10 2022 208 698.8 filed on Aug. 23, 2022, which is expressly incorporated herein by reference in its entirety.

FIELD

The present invention relates to an evaluation device for a sensor system equipped with a magnetic sensor and with at least one inertial sensor, as well as to a sensor system. The present invention also relates to a method for operating a sensor system equipped with a magnetic sensor and at least one inertial sensor.

BACKGROUND INFORMATION

FIG. 1 shows a schematic representation of a conventional sensor device, which is the applicant's internal related art.

The sensor device 10 schematically represented in FIG. 1 includes a 3-D magnetometer 12, a 3-D gyroscope 14, and a 3-D acceleration sensor 16. In addition, conventional sensor device 10 includes evaluation electronics 18, which, with the of at least one first sensor signal 12s of 3-D magnetometer 12, at least one second signal 14s of 3-D gyroscope 14, and at least one third sensor signal 16s of 3-D acceleration sensor 16, determines and outputs an orientation and/or movement information item 20 regarding an orientation and/or a movement of sensor device 10. However, magnetic and/or electric interference in at least part of the surrounding area of 3-D magnetometer 12 may influence the at least one sensor signal 12s and, in this manner, result in inaccuracy and/or corruption of the determined and outputted orientation and/or movement information item 20.

SUMMARY

The present invention provides an evaluation device for a sensor system equipped with a magnetic sensor and at least one inertial sensor; a sensor system; and a method of operating a sensor system equipped with a magnetic sensor and at least one inertial sensor.

The present invention provides advantageous options for detecting magnetic and/or electrical interference in at least part of a surrounding area of a magnetic sensor of a sensor system, which is equipped with the magnetic sensor and also includes at least one inertial sensor; and/or options for detecting a reduced reliability of at least one magnetic sensor signal of the respective magnetic sensor due to the magnetic and/or electrical interference. One particular advantage of the present invention is that the magnetic and/or electrical interference occurring in the at least part of the surrounding area of the magnetic sensor may be detected/determined without additionally having to determine a magnetic field strength distribution for the at least part of the surrounding area, in order to subsequently detect the magnetic and/or electrical interference in light of its evaluation. One further advantage of the present invention is that it also enables detection of comparatively weak magnetic and/or electrical interference in the at least part of the surrounding area, which would not be detectable by an evaluation of a magnetic field strength distribution for the at least part of the surrounding area, using a mathematical model. At this point, it is also emphasized that the present invention may be implemented with the aid of relatively inexpensive electronics that require relatively little space and are designed comparatively simply.

In one advantageous specific example embodiment of the evaluation device according to the present invention, the information item regarding the reliability of the at least one magnetic sensor signal of the magnetic sensor, and/or regarding an occurrence of magnetic and/or electrical interference in the at least part of the surrounding area of the magnetic sensor, may be determined with the aid of the electronics device in view of a comparison of the at least one deviation with at least one predefined or self-determined limiting deviation. The specific embodiment of the evaluation device described here implements a relatively robust procedure for reliably determining the information item regarding the reliability of the at least one magnetic sensor signal and/or regarding an occurrence of magnetic and/or electrical interference.

According to an example embodiment of the present invention, the single limiting deviation or at least one of the limiting deviations may preferably be determined with the aid of the electronics device, in light of a predefined relation, as a function of a time passed since the last recalibration of the single inertial sensor or of at least one of the inertial sensors. Consequently, the specific embodiment of the evaluation device of the present invention described here may take into account that the at least one inertial sensor signal of the at least one inertial sensor often has an offset error, which increases proportionally to the time passed since the last recalibration.

In one further advantageous specific embodiment of the evaluation device of the present invention, with the aid of the electronics device, in view of the at least one deviation and/or the at least one correlation coefficient, it may at least be determined, as an information item, if the reliability of the at least one magnetic sensor signal of the magnetic sensor is currently at least minimally suitable for use as a signal; and an orientation and/or movement information item may optionally be determined with the aid of the electronics device, in view of at least the at least one magnetic sensor signal and/or the at least one value; while otherwise, the orientation and/or movement information item may be determined with the aid of the electronics device, in view of the at least one inertial sensor signal and/or the at least one comparison value, and in disregard of the at least one magnetic sensor signal and the at least one first value. Even if currently, in light of the at least one deviation and/or the at least one correlation coefficient, it may be reliably detected that even the minimum suitability of the at least one magnetic sensor signal for use as a signal is no longer ensured, the specific embodiment of the evaluation device described here may still determine and output a comparatively accurate and reliable orientation and/or movement information item. This ensures that even weak magnetic and/or electrical interference in the at least part of the surrounding area of the magnetic sensor does not have a negative influence on the determined and outputted orientation and/or movement information item.

Alternatively, or in addition, according to an example embodiment of the present invention, with the aid of the electronics device, it may at least be able to be determined, as an information item, if the reliability of the at least one magnetic sensor signal of the magnetic sensor is currently suitable for calibration in view of the at least one deviation and/or the at least one correlation coefficient. Preferably, in this case, the single inertial sensor or at least one of the inertial sensors may only be recalibrated with the aid of the at least one magnetic sensor signal, in view of at least the at least one magnetic sensor signal and/or the at least one value, if the reliability of the at least one magnetic sensor signal is currently suitable for calibration, and if a time passed since the last recalibration of the single inertial sensor or of at least one of the inertial sensors is longer than a predefined minimum wait time. Consequently, in situations, in which, in light of the at least one deviation and/or the at least one correlation coefficient, it may be reliably recognized that no magnetic and/or electrical interference is occurring in the at least part of the surrounding area of the magnetic sensor, the specific embodiment of the evaluation device described here may always take advantage of the ability of the magnetic sensor (in comparison with the at least one inertial sensor) to evaluate data free of absolute and offset errors for recalibrating the single inertial sensor or at least one of the inertial sensors. In this manner, it may be ensured, in particular, that during a later occurrence of magnetic and/or electrical interference in the at least part of the surrounding area, the at least one inertial sensor signal of the at least one recalibrated inertial sensor has a high reliability, and, therefore, use of the at least one magnetic sensor may easily be dispensed with at least transitionally.

The advantages described above are also provided in a sensor system, which is equipped with such an evaluation device; in the at least one inertial sensor, whose at least one inertial sensor signal is supplied to the electronics device of the evaluation device; and in the magnetic sensor, whose at least one magnetic sensor signal is supplied to the electronics device.

For example, the sensor system may include a 3-D magnetometer as the magnetic sensor, and a 3-D acceleration sensor and/or a 3-D gyroscope as the at least one inertial sensor. Therefore, types of sensors preferably employed may be utilized for the electronics.

In particular, the sensor system may be a 3-D orientation sensor, a 3-D motion sensor, an AHRS, or a gesture recognition sensor. Consequently, the present invention has multiple applications.

In addition, execution of a corresponding method for operating a sensor system equipped with a magnetic sensor and with at least one inertial sensor provides the advantages described above. It is particularly emphasized, that the method according to the specific embodiments of the evaluation device and/or the sensor system explained above may be refined further.

BRIEF DESCRIPTION OF THE DRAWINGS

Additional features and advantages of the present invention are explained below in light of the figures.

DETAILED DESCRIPTION OF EXAMPLE EMBODIMENTS

Figure 2:
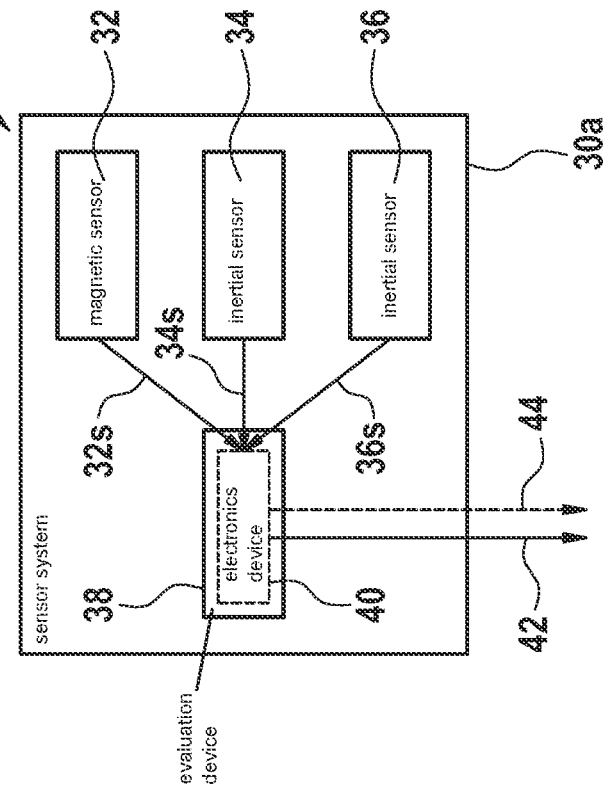
FIG. 2 shows a schematic representation of a sensor system, which interacts with a specific embodiment of the evaluation device of the present invention, in order to explain its method of functioning.
Figure 1:
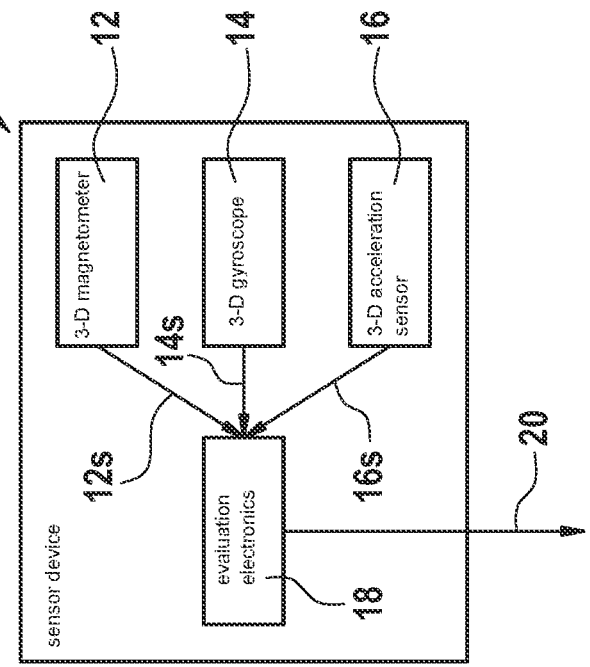
FIG. 1 shows a schematic representation of a conventional sensor device according to the related art.

FIG. 2 shows a schematic representation of a sensor system, which interacts with a specific embodiment of the evaluation device, in order to explain its method of functioning.

The sensor system 30 represented schematically in FIG. 2 includes a magnetic sensor 32 and at least one inertial sensor 34 and 36. Magnetic sensor 32 and the at least one inertial sensor 34 and 36 may be situated in a common housing 30a of sensor system 30. As an alternative, however, magnetic sensor 32 and the at least one inertial sensor 34 and 36 may also be integrated in a plurality of housings formed separately from each other. Sensor system 30 interacts with an evaluation device 38, which, in the specific embodiment of FIG. 2, is, by way of example, a subunit of sensor system 30. In particular, evaluation device 38 may be integrated in housing 30a of sensor system 30. As an alternative, however, evaluation device 38 may also be configured to interact, as a unit separate from sensor system 30, with sensor system 30, that is, with its sensors 32, 34 and 36, in the manner described below.

Magnetic sensor 32 of sensor system 30 is preferably a magnetometer 32. In the example of FIG. 2, sensor system 30 additionally includes two inertial sensors 34 and 36, in particular, a 3-D acceleration sensor 34 and a 3-D gyroscope 36. The 3-D magnetometer 32, 3-D acceleration sensor 34, and/or 3-D gyroscope 36 may each be understood to be a sensor 32, 34, 36 having three axes/sensing directions orthogonal to each other, for each of which a measured variable may be determined with the aid of associated sensor 32, 34, 36.

Evaluation device 38 is formed to include an electronics device 40, to which at least one magnetic sensor signal 32s of magnetic sensor 32 and at least one inertial sensor signal 34s and 36s of the at least one inertial sensor 34 and 36 may be/are supplied. Sensor signals 32s, 34s and 36s may be outputted/may be capable of being outputted by respective sensor 32, 34 or 36 to electronics device 40 via at least one wired connection and/or via at least one wireless connection. With the aid of electronics device 40, at least one value of at least one orientation variable, which represents a spatial orientation and/or change in orientation of sensor system 30, is/may be determined in view of the at least one magnetic sensor signal 32s and the at least one inertial sensor signal 34s and 36s supplied. A sensor data fusion algorithm suitable for this may be stored in electronics device 40. For example, in view of the at least one magnetic sensor signal 32s and the at least one inertial sensor signal 34s and 36s supplied, a NDOF (9 degrees of freedom) quaternion may be determined/be able to be determined by electronics device 40 as the at least one value.

It is expressly emphasized that the at least one inertial sensor 34 and 36 is not to be understood as a magnetic sensor. Therefore, in contrast to the at least one inertial sensor 34 and 36, magnetic sensor 32 has the advantage that if its surroundings are free of magnetic and/or electrical interference, then a spatial orientation and/or change in orientation of sensor system 30 relative to the north magnetic pole may be determined absolutely, accurately, and reliably with the aid of magnetic sensor 32. If no magnetic and/or electrical interference occurs in the surroundings of magnetic sensor 32, then the at least one value may therefore be determined relatively accurately and reliably on the basis of consideration of the at least one magnetic sensor signal 32s, as well. However, an occurrence of magnetic and/or electrical interference in at least part of a surrounding area of magnetic sensor 32 may result in inaccurate measurements and/or faulty measurements of magnetic sensor 32.

In addition, at least one comparison value for the at least one orientation variable may be/is determined with the aid of electronics device 40, in view of the at least one inertial sensor signal 34s and 36s of the at least one inertial sensor 34 and 36, but in disregard of the at least one magnetic sensor signal 32s of magnetic sensor 32. A sensor data fusion algorithm suitable for this may also be stored in electronics device 40. In the example of FIG. 2, an IMU (inertial measurement unit) quaternion is determined as the at least one comparison value.

While magnetic sensor 32 is able to measure the spatial orientation and/or change in orientation of sensor system 32 absolutely with respect to the north magnetic pole, this is not possible with the aid of the at least one inertial sensor 34 and 36. Thus, even shortly after a calibration of the at least one inertial sensor 34 and 36, an offset error of the at least one inertial sensor signal 34s and 36s of the at least one inertial sensor 34 and 36 occurs, which increases with increasing time since the last recalibration of the single inertial sensor or at least one of inertial sensors 34 and 36. Therefore, the at least one comparison value determined only in view of the at least one inertial sensor signal 34s, 36s possesses a drift. However, magnetic and/or electrical interference has, as a rule, no/hardly any influence on an accuracy or a reliability of the at least one inertial sensor signal 34s and 36s of the at least one inertial sensor 34 and 36.

In addition, at least one deviation of the at least one value from the at least one associated comparison value, and/or at least one correlation coefficient between the at least one value and the at least one comparison value, may be determined with the aid of electronics device 40. The at least one deviation may be understood to be, e.g., a magnitude of a difference of the at least one value from the at least one associated comparison value. The at least one correlation coefficient may be determined with the aid of a correlation analysis executed, using the at least one value and the at least one comparison value.

Subsequently, an information item 42 regarding a reliability of the at least one magnetic sensor signal 32s of magnetic sensor 32 and/or regarding an occurrence of magnetic and/or electrical interference in the at least part of the surrounding area of magnetic sensor 32 may be/is determined with the aid of electronics device 40 in view of at least the at least one deviation and/or the at least one correlation coefficient. Since magnetic and/or electrical interference does not affect/hardly affects the at least one inertial sensor signal 34s and 36s, the at least one deviation and/or the at least one correlation coefficient provides a comparatively easily executable and relatively robust option for detecting magnetic and/or electrical interference in the at least part of the surrounding area of magnetic sensor 32, and/or for deducing any decreased reliability of the at least one magnetic sensor signal 32s due to the occurring magnetic and/or electrical interference. As becomes clear from the following description, even comparatively weak magnetic and/or electrical interference, which is, as a rule, not able to be detected by conventional measuring methods, even while taking into account a high degree of expenditure, may be detected by electronics device 40 in the manner described above. In addition, electronics device 40 may also perform its advantageous function with the aid of comparatively simple and robust electronics, which require relatively little space and may additionally be produced inexpensively.

As an information item 42, electronics device 40 may optionally determine and output at least one information item/warning information item 42 regarding the current appearance of magnetic and/or electrical interference in view of the at least one deviation and/or the at least one correlation coefficient. In this case, with the aid of information item/warning information item 42, at least one further device of sensor system 30 and/or of a device (not shown) equipped with sensor system 30 may be informed/warned with regard to the detected magnetic and/or electrical interference.

In the same way, in view of the at least one deviation and/or the at least one correlation coefficient, electronics device 40 may be configured/programmed to determine, as information item 42, if the reliability of the at least one magnetic sensor signal 32s is at least currently minimally suitable for use as a signal. For example, electronics device 40 determines, as information item 42, that the reliability of the at least one magnetic sensor signal 32s is currently at least minimally suitable for use as a signal, or that the reliability of the at least one magnetic sensor signal 32s is currently not even minimally suitable for use as a signal. If electronics device 40 determines that the reliability of the at least one magnetic sensor signal 32s is currently at least minimally suitable for use as a signal, then an orientation and/or movement information item 44 is/may be determined by electronics device 40 in view of at least the at least one magnetic sensor signal 32s and/or the at least one first value. In this case, it is possible for the at least one inertial sensor signal 34s and 36s and/or the at least one comparison value to be considered by electronics device 44, as well, in the determination of orientation and/or movement information item 44. Otherwise, that is, if electronics device 40 determines that the reliability of the at least one magnetic sensor signal 32s is currently not even minimally suitable for use as a signal, then orientation and/or movement information item 44 is/may be determined with the aid of electronics device 40, in view of the at least one inertial sensor signal 34s and 36s and/or the at least one comparison value, but in disregard of the at least one magnetic sensor signal 32s and/or the at least one value.

Consequently, when the reliability of the at least one magnetic sensor signal 32s is currently at least minimally suitable for use as a signal, as well as when the reliability of the at least one magnetic sensor signal 32s is currently not even minimally suitable for use as a signal, electronics device 40 always ensures that orientation and/or movement information item 44 is determined with regard to the data optimized in view of the absence or presence of magnetic and/or electrical interference. Therefore, the orientation and/or movement information item 44 outputted by evaluation device 38/its electronics device 40 is always relatively accurate and comparatively reliable. Thus, the sensor system 30 equipped with/interacting with evaluation device 38 is particularly advantageously suitable as a 3-D orientation sensor and/or as a 3-D motion sensor. In particular, sensor system 30 may be used as an AHRS (attitude heading reference system), that is, as a measuring system for determining roll/pitch/yaw angle changes, accelerations, and heading, in particular, for controlling airplanes or airplane models. It may also be used, in order to detect, as a gesture recognition sensor, gestures of a moving hand or a moving head of a person, to which sensor system 30 is attached. Sensor system 30 may also be used advantageously in an electronic device, a robot, and a vehicle/motor vehicle.

It is emphasized that the output of the reliable and/or accurate orientation and/or movement information item 44 does not require any complex filtering of the at least one magnetic sensor signal 32s. In particular, it is not necessary to "filter out" the effects of magnetic and/or electrical interference in the at least part of the surrounding area of magnetic sensor 32, from its at least one magnetic sensor signal 32s, with the aid of a complex mathematical model. This has an advantageous effect on the manufacturing costs and the space requirements of evaluation device 38 and/or of the sensor system 30 equipped with it.

Alternatively, or in addition, electronics device 40 may at least be configured/programmed to determine, as information item 42, if the reliability of the at least one magnetic sensor signal 32s is currently suitable for calibration in view of the at least one deviation and/or the at least one correlation coefficient. For example, electronics device 40 then determines, as information item 42, that the reliability of the at least one magnetic sensor signal 32s is currently suitable for calibration, or that the reliability of the at least one magnetic sensor signal 32s is currently not suitable for calibration. Preferably, electronics device 40 is only configured/programmed to recalibrate the single inertial sensor or at least one of inertial sensors 34 and 36 in view of at least the at least one magnetic sensor signal 32s and/or the at least one value, if the reliability of the at least one magnetic sensor signal 32s is currently at least suitable for calibration and a time passed since the last recalibration of the single inertial sensor or at least one of inertial sensors 34 and 36 is longer than a predefined minimum wait time. If the time elapsed since the last recalibration of the single inertial sensor or at least one of inertial sensors 34 and 36 is longer than the minimum wait time, but the reliability of the at least one magnetic sensor signal 32s is not currently suitable for calibration, then in this case, due to the configuration/programming of electronics device 40, the recalibration of the single inertial sensor or at least one of inertial sensors 34 and 36 is prevented, until electronics device 40 redetermines that the reliability of the at least one magnetic sensor signal 32s is currently suitable for calibration.

Consequently, in particular, if there is no magnetic and/or electrical interference in the at least part of the surrounding area of magnetic sensor 32, the configuration/programming of electronics device 40 described here allows the high measurement accuracy of magnetic sensor 32 to be used for recalibrating the single inertial sensor or at least one of inertial sensors 34 and 36. After each recalibration, effected by electronics device 40, of the single inertial sensor or at least one of inertial sensors 34 and 36, the at least one inertial sensor signal 34s and 36s exhibits, at least transitionally, not more than a relatively small offset error after the re-executed calibration. In this manner, with the aid of electronics device 40, it may be ensured that if, after the effected recalibration, the at least one magnetic sensor signal 32s is no longer sufficiently reliable due to magnetic and/or electrical interference, orientation and/or movement information item 44 may nevertheless be determined reliably at least transitionally, using the at least one inertial sensor signal 34s and 36s.

For example, the at least one deviation of the at least one value from the at least one associated comparison value may be able to be compared by/may be compared by the electronics device to at least one predefined or self-determined limiting deviation, for example, to a limiting deviation regarding the minimum suitability for use as a signal, and/or to a (further) limiting deviation regarding the suitability for calibration. Optionally, electronics device 40 is configured/programmed to determine information item 42 in view of the comparison of the at least one deviation with the at least one associated limiting deviation. In this case, as an advantageous further refinement, the at least one limiting deviation may be/may be able to be determined with the aid of electronics device 40, in light of a predefined relation, as a function of the time passed since the last recalibration of the single inertial sensor or of at least one of inertial sensors 34 and 36.

Figure 3A:
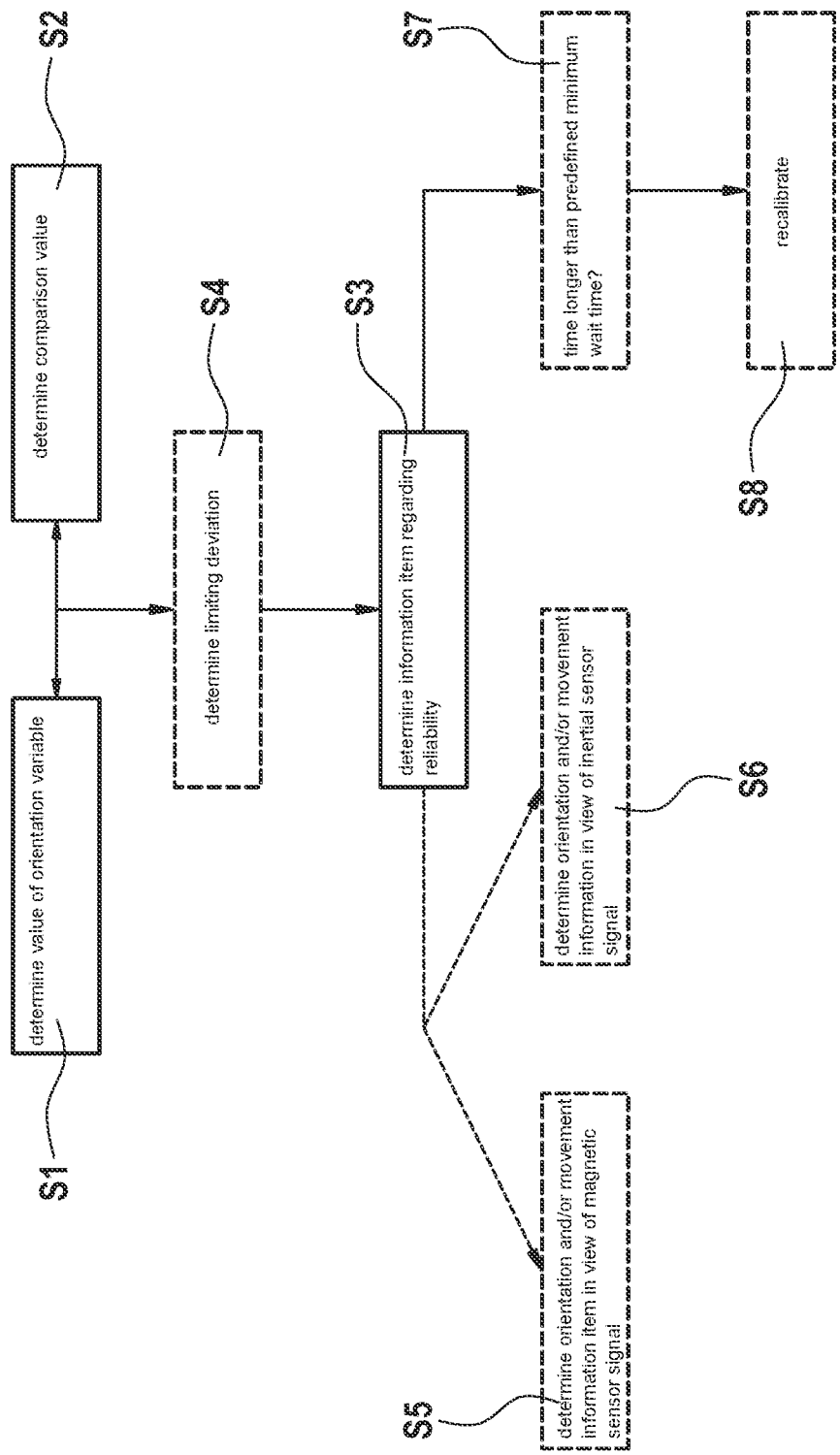
FIGS. 3A and 3B show a flow chart and a coordinate system for explaining a specific embodiment of the method for operating a sensor system equipped with a magnetic sensor and at least one inertial sensor, according to the present invention.
Figure 3B:
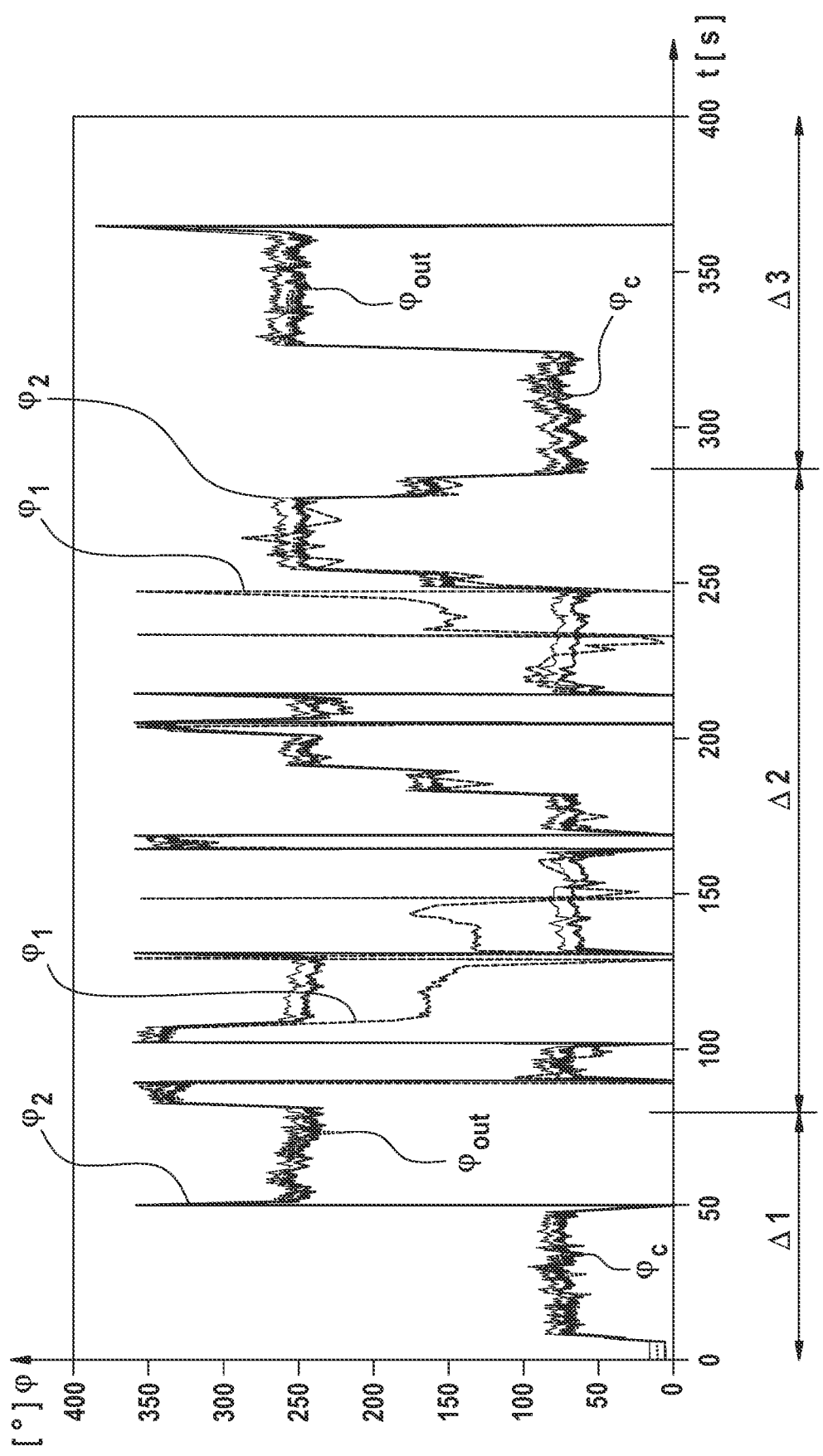

FIGS. 3A and 3B show a flow chart and a coordinate system for explaining a specific embodiment of the method for operating a sensor system equipped with a magnetic sensor and at least one inertial sensor.

It is emphasized that the method described in the following may be implemented, using (nearly) any sensor system, which includes the magnetic sensor and the at least one inertial sensor. Examples of the magnetic sensor and the at least one inertial sensor are already enumerated above.

In one method step S1, at least one value of at least one orientation variable is determined, which represents a spatial orientation and/or change in orientation of the specific sensor system. In method step S1, the at least one value is determined in view of at least one inertial sensor signal of the at least one inertial sensor, and additionally in view of at least one magnetic sensor signal of the magnetic sensor. In the specific embodiment described here, by way of example, a first orientation angle/heading angle φ1 is determined as the at least one value. First orientation angle φ1 may be determined reliably by converting the NDOF (nine degrees of freedom) quaternions to the Euler format. It is a highly sensitive variable for identifying/detecting magnetic and/or electrical interference.

In a method step S2, at least one comparison value is determined for the at least one orientation variable. In method step S2, the at least one comparison value is determined in view of the at least one (the same) inertial sensor signal of the at least one inertial sensor (as in method step S1), but in disregard of the at least one (the same) magnetic sensor signal of the magnetic sensor (as in method step S1). In the specific embodiment described here, a second orientation angle/heading angle φ2 is calculated as the at least one comparison value. For example, second orientation angle φ2 is determined by converting the IMU (inertial measurement unit) quaternion to the Euler format. Method steps S1 and S2 may be executed in any order, overlapping in time, or simultaneously.

Subsequently, in a method step S3, an information item regarding a reliability of the at least one magnetic sensor signal of the magnetic sensor and/or regarding an occurrence of magnetic and/or electrical interference in at least a part of the surrounding area of the magnetic sensor is determined. In order to determine the information item, at least one deviation of the at least one value from the at least one associated comparison value, and/or at least one correlation coefficient between the at least one value and the at least one associated comparison value, is checked. Consequently, execution of method steps S1 through S3 also produces the advantages already explained above.

In order to determine the information item regarding the reliability of the at least one magnetic sensor signal of the magnetic sensor and/or regarding an occurrence of magnetic and/or electrical interference in at least part of the surrounding area of the magnetic sensor, the at least one deviation may be compared to at least one associated limiting deviation. Prior to method step S3, a(n) (optional) method step S4 may advantageously be executed, in which the single limiting deviation or at least one of the limiting deviations is determined, in each instance, in light of a predefined relation, as a function of a time, which has elapsed since the last recalibration of the single inertial sensor or at least one of the inertial sensors. In this manner, it may be taken into account that an error offset, which occurs in the at least one inertial sensor signal, increases as a function of the time passed since the last recalibration. Thus, by executing method step S4, it is ensured that exceedance of the at least one limiting deviation by the at least one deviation is (almost) exclusively attributable to the occurrence of magnetic and/or electrical interference in the at least part of the surrounding area of the magnetic sensor.

In method step S3, e.g., in view of the at least one deviation and/or the at least one correlation coefficient, it may at least be determined, as an information item, if the reliability of the at least one magnetic sensor signal of the magnetic sensor is currently at least minimally suitable for use as a signal. If, as an information item, it is determined that the reliability of the at least one magnetic sensor signal is currently at least minimally suitable for use as a signal, then, in a(n) (optional) method step S5, an orientation and/or movement information item is determined in view of at least the at least one magnetic sensor signal and/or the at least one value. Alternatively, that is, if, as an information item, it is determined that the reliability of the at least one magnetic sensor signal is currently not even minimally suitable for use as a signal, then, as a(n) (optional) method step S6, the orientation and/or movement information item is determined in view of the at least one inertial sensor signal and/or the at least one comparison value, but in disregard of the at least one magnetic sensor signal and the at least one value.

Method steps S5 and S6 are represented schematically in FIG. 3B. In the coordinate system of FIG. 3B, the abscissa is a time axis t (in seconds s), while the ordinate represents (in degrees °) first orientation angle/heading angle $\varphi 1$, second orientation angle/heading angle $\varphi 2$, an orientation/heading angle $\varphi_{out}$ determined as an orientation and/or movement information item with the aid of method step S5 or S6, and a correct angle $\varphi_c$ during the execution of the experiment.

Magnetic or electrical interference does not take place during time intervals Δ1 and Δ3 of the experiment. Consequently, in time intervals Δ1 and Δ2, the orientation angle (p out determined as an orientation and/or movement information item is (substantially) equal to first orientation angle $\varphi 1$. In contrast, magnetic or electrical interference occurs in a time interval Δ2, which is why starting from its initial value (last determined prior to the detection of the magnetic or electrical interference), the orientation angle $\varphi_{out}$ determined as an orientation and/or movement information item is varied according to a temporal change in second orientation angle $\varphi 2$.

Optionally, in method step S3, in view of the at least one deviation and/or the at least one correlation coefficient, as well, it may also at least be determined, as an information item, if the reliability of the at least one magnetic sensor signal of the magnetic sensor is currently suitable for calibration. If, as an information item, it is at least determined that the reliability of the at least one magnetic sensor signal is currently suitable for calibration, then, as a(n) (optional) method step S7, an inquiry is made as to whether a time elapsed since the last recalibration of the single inertial sensor or of at least one of the inertial sensors is longer than a predefined minimum wait time. If the time elapsed since the last recalibration is longer than the minimum wait time, then a(n) (optional) method step S8 is executed. In method step S8, the single inertial sensor or at least one of the inertial sensors is recalibrated in view of at least the at least one magnetic sensor signal and/or the at least one value.

However, if, as an information item, it is determined that the reliability of the at least one magnetic sensor signal is not currently suitable for calibration or the time passed since the last calibration is shorter than the predefined minimum wait time, then the next recalibration of the single inertial sensor or at least one of the inertial sensors is delayed, until the reliability of the at least one magnetic sensor signal is suitable for calibration and the time elapsed since the last recalibration is longer than the predefined minimum wait time.

What is claimed is:

1. An evaluation device for a sensor system equipped with a magnetic sensor and at least one inertial sensor, the evaluation device comprising: an electronics device configured to determine at least one value of at least one orientation variable representing a spatial orientation and/or change in orientation of the sensor system, in view of at least one supplied inertial sensor signal of the at least one inertial sensor, and in view of at least one supplied magnetic sensor signal of the magnetic sensor; wherein the electronic device is configured to determine at least one comparison value for the at least one orientation variable, in view of the at least one inertial sensor signal of the at least one inertial sensor, and in disregard of the at least one magnetic sensor signal of the magnetic sensor; and wherein, the electronics device is configured to determine an information item regarding a reliability of the at least one magnetic sensor signal of the magnetic sensor and/or regarding an occurrence of magnetic and/or electrical interference in at least part of a surrounding area of the magnetic sensor, at least in view of at least a deviation of the at least one value from the at least one comparison value and/or at least one correlation coefficient between the at least one value of the at least one orientation variable and the at least one comparison value.

2. The evaluation device as recited in claim 1, wherein electronics device is configured to determine the information item regarding the reliability of the at least one magnetic sensor signal of the magnetic sensor and/or regarding an occurrence of magnetic and/or electrical interference in the at least part of the surrounding area of the magnetic sensor, in view of a comparison of the at least one deviation with at least one predefined or self-determined limiting deviation.

3. The evaluation device as recited in claim 2, wherein the electronic device is configured to determine a single limiting deviation or at least one of at least one limiting deviations, in light of a predefined relation, as a function of a time elapsed since a last recalibration of at least one of the at least one inertial sensor.

4. The evaluation device as recited in claim 1, wherein the electronics device is configured to determine, in view of the at least one deviation and/or the at least one correlation coefficient, as an information item, if the reliability of the at least one magnetic sensor signal of the magnetic sensor is currently at least minimally suitable for use as a signal.

5. The evaluation device as recited in claim 4, wherein the electronic device is configured to: i) determine an orientation and/or movement information item in view of at least the at least one magnetic sensor signal and/or the at least one value, or ii) determine the orientation and/or movement information item in view of the at least one inertial sensor signal and/or the at least one comparison value, and in disregard of the at least one magnetic sensor signal and the at least one value of the at least one orientation variable.

6. The evaluation device as recited in claim 1, wherein the electronics device is configured to determine, in view of the at least one deviation and/or the at least one correlation coefficient, as an information item, if the reliability of the at least one magnetic sensor signal of the magnetic sensor is currently suitable for calibration, and wherein the at least one inertial sensor may only be recalibrated using the electronics device, in view of at least the at least one magnetic sensor signal and/or the at least one value of the at least one orientation variable, when the reliability of the at least one magnetic sensor signal is currently suitable for calibration and a time elapsed since a last recalibration of the at least one inertial sensor is longer than a predefined minimum wait time.

7. A sensor system, comprising: evaluation device, including: an electronics device configured to determine at least one value of at least one orientation variable representing a spatial orientation and/or change in orientation of the sensor system, in view of at least one supplied inertial sensor signal of at least one inertial sensor, and in view of at least one supplied magnetic sensor signal of a magnetic sensor; wherein the electronic device is configured to determine at least one comparison value for the at least one orientation variable, in view of the at least one inertial sensor signal of the at least one inertial sensor, and in disregard of the at least one magnetic sensor signal of the magnetic sensor; and wherein, the electronics device is configured to determine an information item regarding a reliability of the at least one magnetic sensor signal of the magnetic sensor and/or regarding an occurrence of magnetic and/or electrical interference in at least part of a surrounding area of the magnetic sensor, at least in view of at least a deviation of the at least one value from the at least one comparison value and/or at least one correlation coefficient between the at least one value of the at least one orientation variable and the at least one comparison value; the at least one inertial sensor whose at least one inertial sensor signal is supplied to the electronics device of the evaluation device; and the magnetic sensor whose at least one magnetic sensor signal is supplied to the electronics device.

8. The sensor system as recited in claim 7, wherein the sensor system includes a 3-D magnetometer as the magnetic sensor, and a 3-D acceleration sensor and/or a 3-D gyroscope as the at least one inertial sensor.

9. The sensor system as recited in claim 7, wherein the sensor system is a 3-D orientation sensor, or a 3-D motion sensor, or an AHRS, or a gesture recognition sensor.

10. A method for operating a sensor system equipped with a magnetic sensor and at least one inertial sensor, the method comprising the following steps: determining at least one value of at least one orientation variable representing a spatial orientation and/or change in orientation of the sensor system, in view of at least one inertial sensor signal of the at least one inertial sensor, and in view of at least one magnetic sensor signal of the magnetic sensor; determining at least one comparison value for the at least one orientation variable in view of the at least one inertial sensor signal of the at least one inertial sensor and in disregard of the at least one magnetic sensor signal of the magnetic sensor; and determining an information item regarding a reliability of the at least one magnetic sensor signal of the magnetic sensor and/or regarding an occurrence of magnetic and/or electrical interference in at least part of a surrounding area of the magnetic sensor, in view of at least a deviation of the at least one value from the at least one comparison value and/or at least one correlation coefficient between the at least one value of the at least one orientation variable and the at least one comparison value.

11. The method as recited in claim 10, wherein the information item regarding the reliability of the at least one magnetic sensor signal of the magnetic sensor and/or regarding an occurrence of magnetic and/or electrical interference in the at least part of the surrounding area of the magnetic sensor is determined in view of a comparison of the at least one deviation with at least one predefined or self-determined limiting deviation, and the at least one limiting deviation is determined in light of a predefined relation, as a function of a time elapsed since a last recalibration of at least one of the at least one inertial sensor.

12. The method as recited in claim 10, wherein in view of the at least one deviation and/or the at least one correlation coefficient, it is at least determined, as an information item, when the reliability of the at least one magnetic sensor signal of the magnetic sensor is currently at least minimally suitable for use as a signal; and based on determining, as an information item, that the reliability of the at least one magnetic sensor signal is currently at least minimally suitable for use as a signal, an orientation and/or movement information item is determined in view of at least the at least one magnetic sensor signal and/or the at least one value, and wherein, based on determining, as an information item, that the reliability of the at least one magnetic sensor signal currently is not even minimally suitable for use as a signal, the orientation and/or movement information item is determined in view of the at least one inertial sensor signal and/or of the at least one comparison value and in disregard of the at least one magnetic sensor signal and the at least one value.

13. The method as recited in claim 10, wherein in view of the at least one deviation and/or the at least one correlation coefficient, it is at least determined, as an information item, when the reliability of the at least one magnetic sensor signal of the magnetic sensor is currently suitable for calibration; and based on determining, as an information item, that the reliability of the at least one magnetic sensor signal is currently suitable for calibration, and a time elapsed since a last recalibration of at least one of the at least one inertial sensor is longer than a predefined minimum wait time, at least one of the at least one inertial sensor is recalibrated in view of at least the at least one magnetic sensor signal and/or the at least one value, and based on determining, as an information item, that the reliability of the at least one magnetic sensor signal is currently not suitable for calibration, and/or the time elapsed since the last recalibration is shorter than the predefined minimum wait time, a next recalibration of the at least one of the at least one sensor is delayed, until the reliability of the at least one magnetic sensor signal is currently suitable for calibration and the time elapsed since the last recalibration is longer than the predefined minimum wait time.

\* \* \* \* \*